Figure 1:
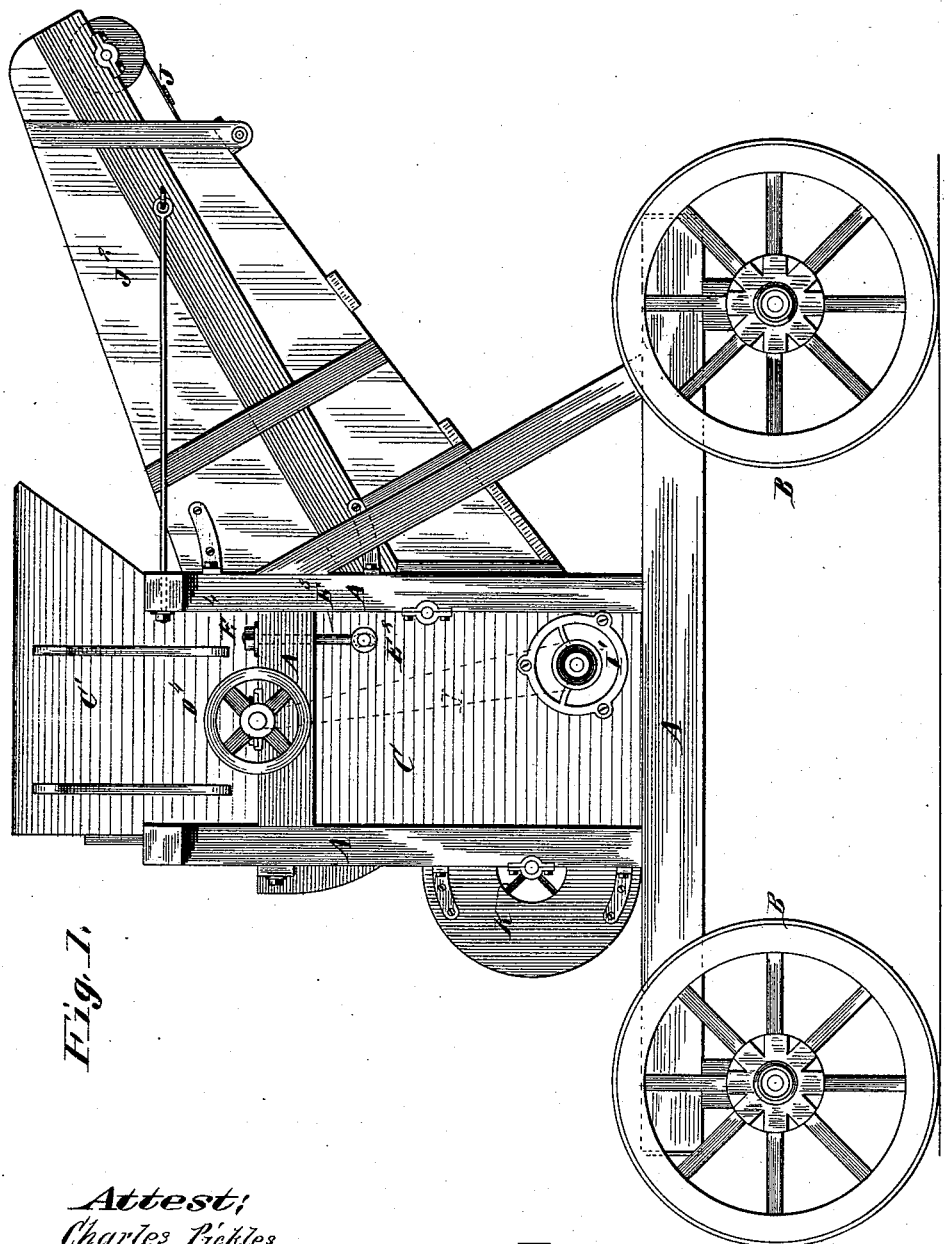

(No Model.) 3 Sheets—Sheet 1.

W. S. REEDER.
MACHINE FOR MASHING STRAW.

No. 349,607. Patented Sept. 21, 1886.

Attest:
Charles Pickles
F. A. Hopkins

Inventor:
Wm. S. Reeder
By Knight Bros
attys (No Model.) 3 Sheets—Sheet 2.
W. S. REEDER.
MACHINE FOR MASHING STRAW.
No. 349,607. Patented Sept. 21, 1886.
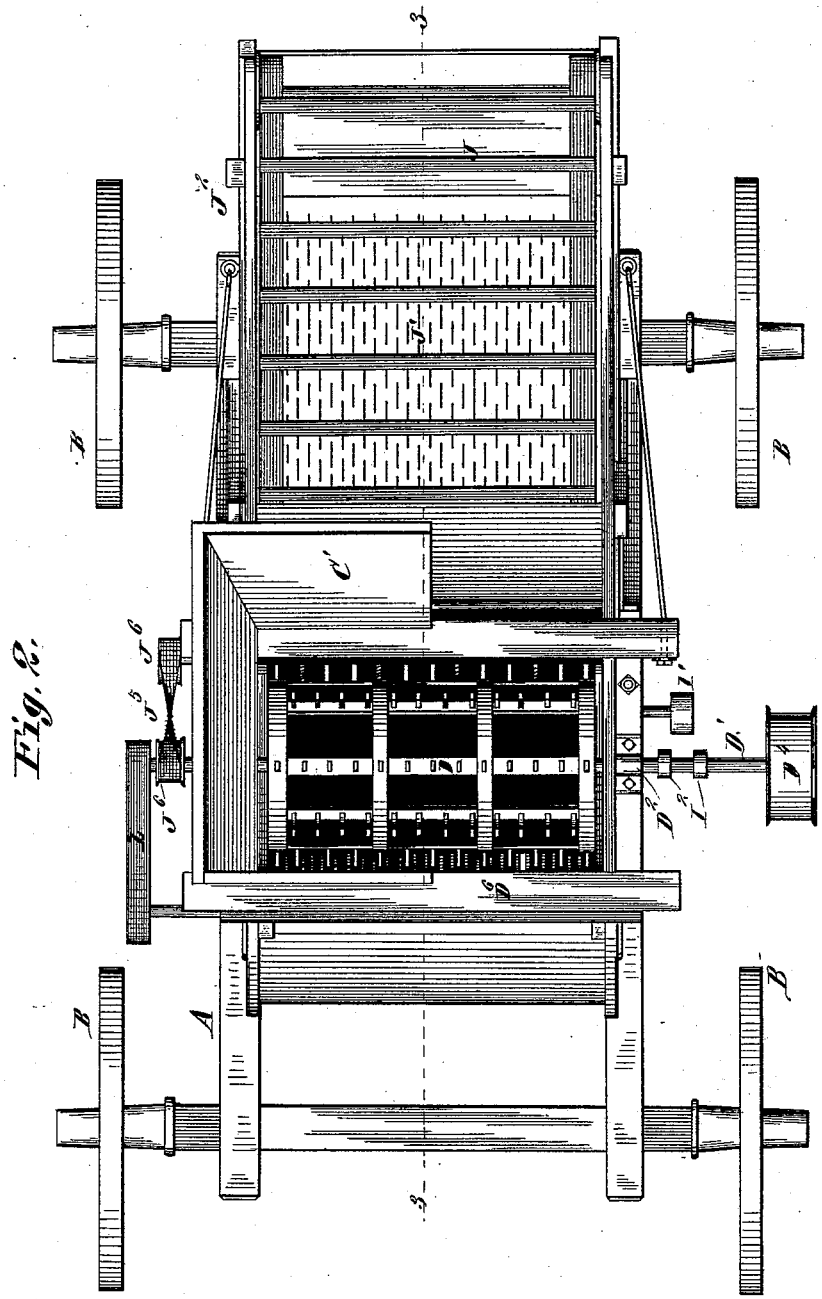
Attest:
Charles Pickles
F. A. S. Hopkins
Inventor:
Wm. S. Reeder
By Knight Bros
attys

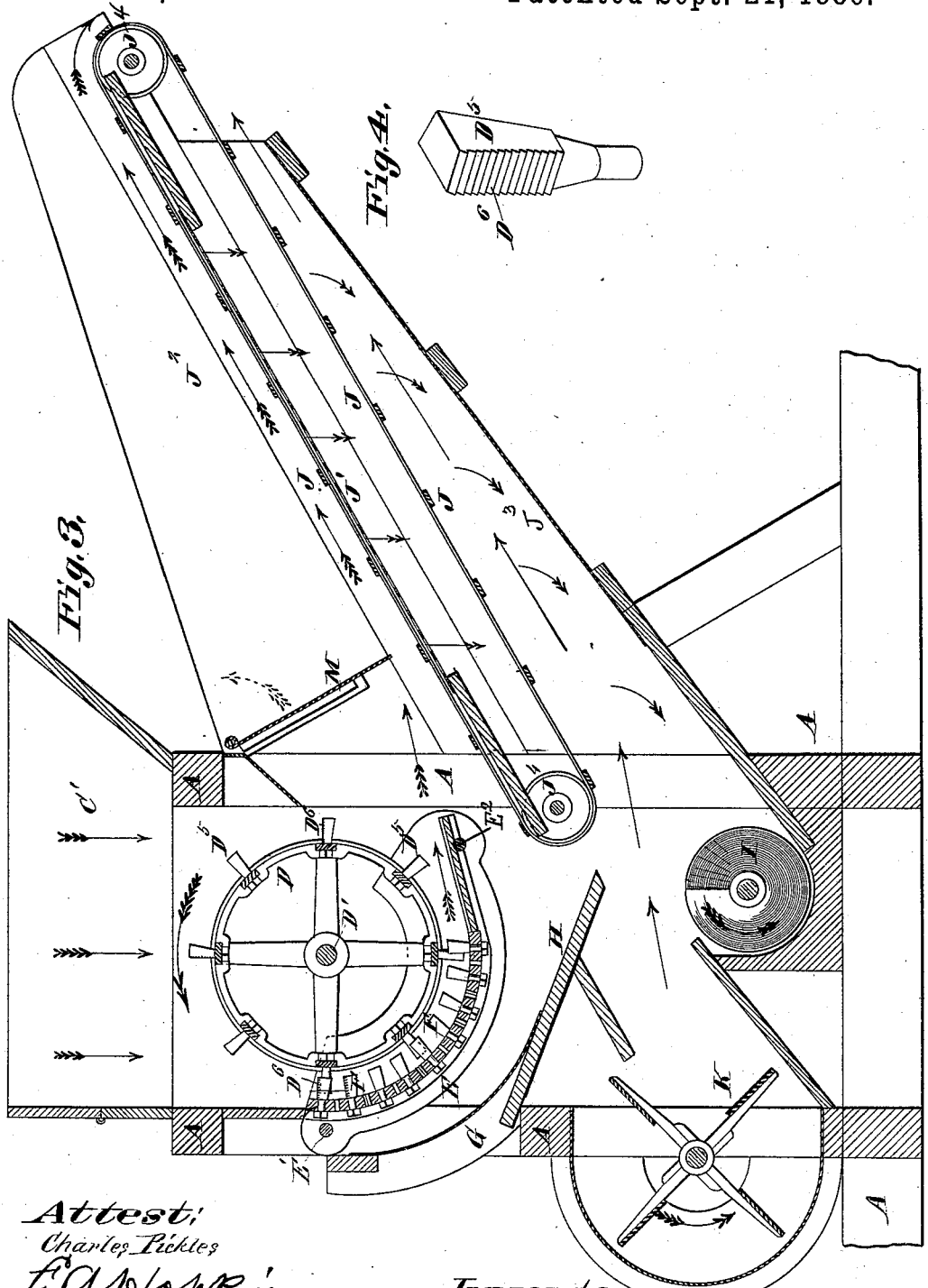

UNITED STATES PATENT OFFICE.

WILLIAM S. REEDER, OF ST. LOUIS, MISSOURI, ASSIGNOR TO THE KINGSLAND & FERGUSON MANUFACTURING COMPANY, OF SAME PLACE.

MACHINE FOR MASHING STRAW.

SPECIFICATION forming part of Letters Patent No. 349,607, dated September 21, 1886.

Application filed April 12, 1886. Serial No. 198,625. (No model.)

*To all whom it may concern:*

Be it known that I, WILLIAM S. REEDER, of the city of St. Louis, in the State of Missouri, have invented a certain new and useful Improvement in Machines for Mashing Straw, of which the following is a full, clear, and exact description, reference being had to the accompanying drawings, forming part of this specification, and in which—

Figure 1 is a side elevation of my improved machine. Fig. 2 is a top view, part of the hopper being omitted. Fig. 3 is a longitudinal vertical section taken on line 3 3, Fig. 2. Fig. 4 is a perspective view of one of the teeth of the concave or cylinder.

My invention relates to an improved machine for mashing or breaking up straw, and it is more particularly intended for use in southern countries, where rice, wheat, and other straw is mashed or crushed and broken up after it leaves the thrasher, for the purpose of putting it in a more available condition for food for animals; and my invention consists in features of novelty hereinafter fully described, and pointed out in the claims.

Referring to the drawings, A represents the frame of the machine, supported on suitable wheels, B, by which it is conveyed from place to place.

C represents a vertical box or case, in the upper part of which are a cylinder, D, and concave E. The box or case is surmounted by a hopper, C'. The cylinder is supported on a shaft, D', that extends through the sides of the case, and is journaled in boxes $D^2$, secured to the frame of the machine. The concave is pivoted by means of a rod, E', at its upper end to the frame of the machine, and its lower end is supported by a hanger comprised of a horizontal rod, $E^2$, that extends beneath and is secured to the free end of the concave, and vertical rods $E^3$, connected to the rod $E^2$ and extending upward and passing through the frame A, and having nuts on their upper ends, by which they can be adjusted to raise or lower the concave and increase or diminish the distance between the concave and the cylinder. The cylinder is driven by any suitable motor-power, with which it is connected by a belt (not shown) passing over a pulley, $D^4$, on the shaft D'. The cylinder has teeth $D^5$, part of which are serrated on their forward edges, as shown at $D^6$, Figs. 2, 3, and 4. I prefer to serrate or notch each third tooth in every row, as shown in Fig. 2, leaving the rest of the teeth smooth and plain. The concave has teeth, the first two or upper rows of the teeth being notched, as shown in Figs. 3 and 4, these teeth being notched the same as those that are notched of the cylinder.

I prefer the notches or teeth to be presented toward the advance of the cylinder-teeth, so that as the cylinder revolves and pulls the straw toward it it will be torn and mashed by these two upper rows of teeth of the concave and between them and the notches of the cylinder-teeth. These notches have a tendency to tear the straw more than to mash it, and the plain teeth have the reverse effect.

G represents an apron and H a board beneath the concave and cylinder, so that in case there should be any grain in the straw when it enters the machine it may fall upon this apron and board, and from there onto a screw-conveyer, I, located in the bottom of the case C, and driven by a belt fitting on the shaft D' between collars $I^2$, and on a pulley, I', on the shaft of the conveyer I.

In case any grain should be carried in the straw from the concave onto the raddle J, that conveys the straw from the machine, it falls through a perforated bottom, J', of the straw-carrier $J^2$, over which the raddle is located, and falls from there onto a solid bottom, $J^3$, and is conveyed down to the conveyer I, as shown by the double-headed arrows, Fig. 3.

The raddle passes over drums $J^4$, and is operated by a belt, $J^5$, and pulleys $J^6$, connecting it to the shaft D' of the cylinder.

To clear the grain that passes to the conveyer I of the chaff and refuse matter, I locate a fan, K, in the forward part of the case C, which causes a current of air to pass through between the raddle and the bottom $J^3$ of the elevator, as indicated by the featherless arrows in Fig. 3. This fan is driven by a belt, L, that connects it with the shaft D' of the cylinder, as shown in Fig. 2.

M represents a hinged apron located over the raddle, which opens to allow the passage of the straw on the raddle, as indicated by the dotted arrow, Fig. 3.

The passage of the straw into and from the machine is indicated by the full arrows in Fig. 3.

I claim as my invention—

1. In a machine for mashing and breaking straw, the combination of a case provided with a hopper, a cylinder and concave beneath the hopper, provided with tearing and mashing teeth, and a raddle for conveying the straw from the case, substantially as set forth.

2. In a machine for breaking and mashing straw, the combination of the case, a hopper located on the case, a cylinder provided with teeth, part of which are notched or serrated and part smooth, a concave provided with teeth, part of which are notched or serrated and part smooth, and a carrier for conveying the straw from the case, substantially as set forth.

3. In a machine for breaking and mashing straw, the combination of the cylinder and concave provided with teeth, part of the teeth of the cylinder being notched or serrated and part smooth, and the upper row or rows of the concave being notched or serrated, the remaining teeth being smooth, substantially as shown and described, for the purpose set forth.

WILLIAM S. REEDER.

Witnesses:
SAML. KNIGHT,
BENJN. A. KNIGHT.